(12) United States Patent
Lantis

(10) Patent No.: US 9,392,755 B1
(45) Date of Patent: Jul. 19, 2016

(54) METHOD AND APPARATUS FOR WATERING AND SUPPORTING A PLANT

(71) Applicant: Claudia Lantis, Aurora, CO (US)

(72) Inventor: Claudia Lantis, Aurora, CO (US)

( * ) Notice: Subject to any disclaimer, the term of this patent is extended or adjusted under 35 U.S.C. 154(b) by 84 days.

(21) Appl. No.: 14/462,610

(22) Filed: Aug. 19, 2014

Related U.S. Application Data

(60) Provisional application No. 61/868,200, filed on Aug. 21, 2013.

(51) Int. Cl.
  *A01G 27/00* (2006.01)
  *A01G 1/00* (2006.01)
  *A01G 9/12* (2006.01)

(52) U.S. Cl.
  CPC ................ *A01G 27/00* (2013.01); *A01G 1/001* (2013.01); *A01G 9/124* (2013.01)

(58) Field of Classification Search
  CPC ....... A01G 9/247; A01G 27/00; A01G 27/02; A01G 27/05
  USPC ...................... 47/40.5, 47, 48.5, 79
  See application file for complete search history.

(56) References Cited

U.S. PATENT DOCUMENTS

| 221,620 | A | | 11/1879 | Sikes | |
|---|---|---|---|---|---|
| 1,542,683 | A | | 6/1925 | Everett | |
| 1,984,265 | A | | 12/1934 | Hamer | |
| 2,809,468 | A | * | 10/1957 | Eliot | A01G 27/006 47/44 |
| 3,188,771 | A | | 6/1965 | Ballai | |
| 3,345,774 | A | * | 10/1967 | Delbuguet | A01G 29/00 47/44 |
| 3,471,968 | A | * | 10/1969 | Letz | A01G 9/122 248/125.3 |
| 4,745,706 | A | * | 5/1988 | Muza | A01G 29/00 47/47 |
| 4,866,880 | A | * | 9/1989 | Weinblatt | A01G 29/00 222/650 |
| 4,962,613 | A | | 10/1990 | Nalbandian | |
| D331,865 | S | * | 12/1992 | Parker | 47/70 |
| D346,098 | S | * | 4/1994 | Schweiker, Jr. | D8/1 |
| 5,327,678 | A | * | 7/1994 | Schweiker | A01G 9/124 47/47 |
| 5,921,025 | A | | 7/1999 | Smith | |
| 6,079,156 | A | | 6/2000 | Colovic | |
| 6,092,332 | A | | 7/2000 | Roess et al. | |
| 6,167,651 | B1 | | 1/2001 | Luddy | |
| 6,230,437 | B1 | | 5/2001 | Wolverton et al. | |
| 6,349,997 | B1 | | 2/2002 | Unterforsthuber et al. | |
| 6,615,543 | B1 | | 9/2003 | Palsrok | |
| 7,225,585 | B2 | | 6/2007 | Zayeratabat | |
| 7,627,982 | B2 | | 12/2009 | Beasley et al. | |
| 7,987,816 | B1 | * | 8/2011 | Walsh | A01K 5/0114 119/61.5 |
| 2007/0084108 | A1 | * | 4/2007 | Hertlein | A01G 9/122 47/47 |
| 2008/0022591 | A1 | * | 1/2008 | Jung | A01G 9/02 47/73 |
| 2009/0320359 | A1 | * | 12/2009 | Hertlein | A01G 9/124 47/47 |
| 2011/0036006 | A1 | | 2/2011 | Griebel | |

* cited by examiner

*Primary Examiner* — David Parsley
*Assistant Examiner* — Danielle Clerkley
(74) *Attorney, Agent, or Firm* — Colorado Patents

(57) ABSTRACT

A plant watering and support device including an elongated tubular body having an open upper end, a lower end and a central portion of predetermined width located between the ends is disclosed. The open upper end and central tubular portion define a hollow cavity for receiving water added through said open upper end. In addition, the central tubular portion further defines a plurality of perforations in fluid communication with the hollow cavity and which extend through the tubular portion to allow water added to the device to exit the device through the perforations to water a plant. The device also includes at least one hollow extension section. A wide preferably heavy base is also provided for supporting the tubular body in an upright position and lowering the device's center of gravity to prevent the device from easily tipping over.

7 Claims, 2 Drawing Sheets

METHOD AND APPARATUS FOR WATERING AND SUPPORTING A PLANT

CROSS REFERENCE TO RELATED APPLICATION

This application is a nonprovisional application claiming the benefit under 35 USC 119(e) of U.S. provisional application Ser. No. 61/868,200 filed on Aug. 21, 2013 which is incorporated herein by reference.

FIELD OF THE INVENTION

This invention relates to devices for watering and supporting plants, and relates particularly, though not exclusively, to a plant watering and support device for use with potted plants which reduces the possibility of a potted plant tipping over and facilitates transplanting of the plant.

BACKGROUND OF THE INVENTION

U.S. Pat. No. 7,627,982 to Beasley et al. (Beasley) provides a plant and watering and feeding device including an elongate tubular body having an upper portion and a lower portion, said elongate tubular body having a hollow cavity for receiving water and feed therein, said upper portion having an opening in fluid communication with said hollow cavity for supplying said water and feed into said device, said lower portion having a plurality of apertures in fluid communication with said hollow cavity and the exterior of said device, wherein said device is positionable relative to a plant such that said lower portion of said device is surrounded by soil proximate the roots of said plant, and wherein said water and feed may be introduced into said device through said opening and subsequently slowly released into said soil proximate said roots of said plant via said apertures.

While the device of Beasley undoubtedly provides a way of watering plants, it would not work well in a pot for potted plants since such pots are typically not deep enough to support the stake-like device of Beasley. Moreover, even if the device of Beasley could be installed in a pot for potted plants such an assembly would likely tip over quite easily since the device would be quite top heavy. The Beasley device also provides no root support for a plant that is to be transplanted.

Accordingly, objects of the present invention include providing a plant watering and support device which provides root support during transplanting and which can be easily installed in a pot of the type for potted plants and which has a low center of gravity so that it is less likely to tip over than pots containing other watering devices or no watering device at all.

SUMMARY OF THE INVENTION

The present invention addresses these objects by providing a plant watering and support device including an elongated tubular body having an open upper end, a lower end and a central portion of predetermined width located between the open upper and lower ends. The open upper end and central tubular portion further define a hollow cavity for receiving water added through the open upper end. The central tubular portion also defines a plurality of perforations in fluid communication with the hollow cavity and which extend through the tubular portion to allow water added to the device to exit the device through the perforations to water a plant. In addition, the device includes at least one hollow extension section having an open upper end, an open lower end and a hollow non-perforated central portion wherein the open lower end of the extension section is adapted for removable, preferably threaded, attachment to the open upper end of the tubular body. A wide base is also provided having a center portion for attachment to the lower end of the tubular body. The base supports the tubular body in an upright position and has a width which is at least twice the predetermined width of the central portion. In a preferred embodiment, the base has a weight which lowers the device's center of gravity to reduce the likelihood of the device tipping over. The device is positionable relative to a plant preferably a potted plant so that water may be introduced into the device through an open upper end of the body or extension section and released into the soil proximate the roots of the plant via the perforations provided in the device's central tubular portion. A method utilizing the device to pot a plant is also provided.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings wherein like reference numerals refer to like parts throughout the various views of the drawings and in which.

DETAILED DESCRIPTION OF THE PREFERRED EMBODIMENTS

Figure 1:
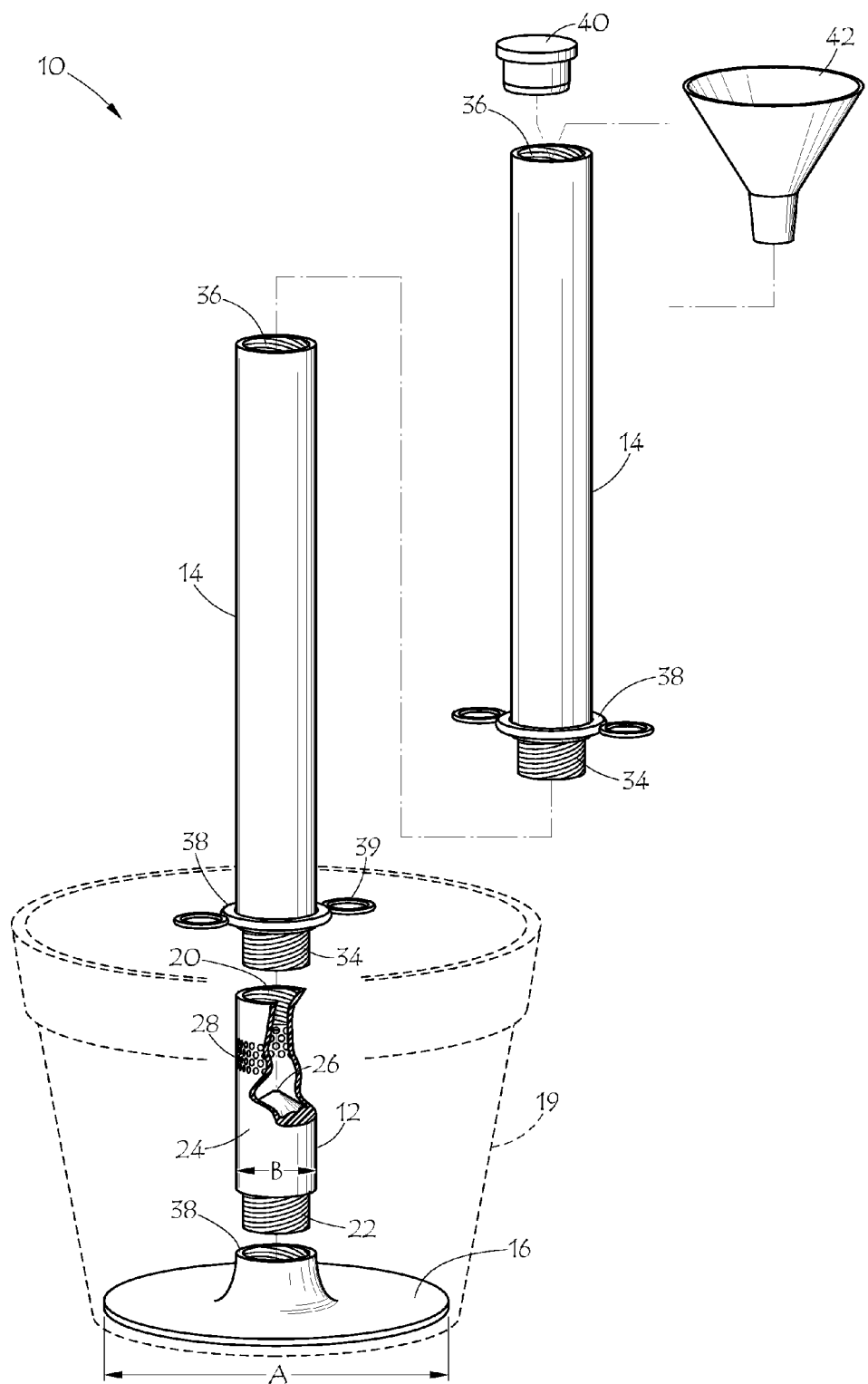
FIG. 1 is an exploded perspective view of the plant watering and feeding device of the present invention; and, FIG. 2 is a perspective view of the plant watering and support device of FIG. 1 shown supporting a plant in a pot.

Referring now to the drawings, wherein like reference numerals correspond to like parts throughout, there is shown a plant watering and support device 10 having an elongated tubular body 12, first and second hollow tubular extension sections 14 and a generally wide base 16 for watering and supporting a plant 18 in a pot 19.

The elongated tubular body 12 has an internally threaded open upper end 20, an externally threaded lower end 22 and a central portion 24 of predetermined width located between its upper and lower ends. The open upper end 20 and central tubular portion further define a hollow cavity 26 for receiving water added through the upper end. In addition, the central tubular portion defines a plurality of perforations 28 in fluid communication with the hollow cavity. The perforations extend through the central tubular portion to allow water added to the device to exit the device through the perforations into the earth or plant soil (not shown) surrounding plant 18 to water the plant.

Figure 2:
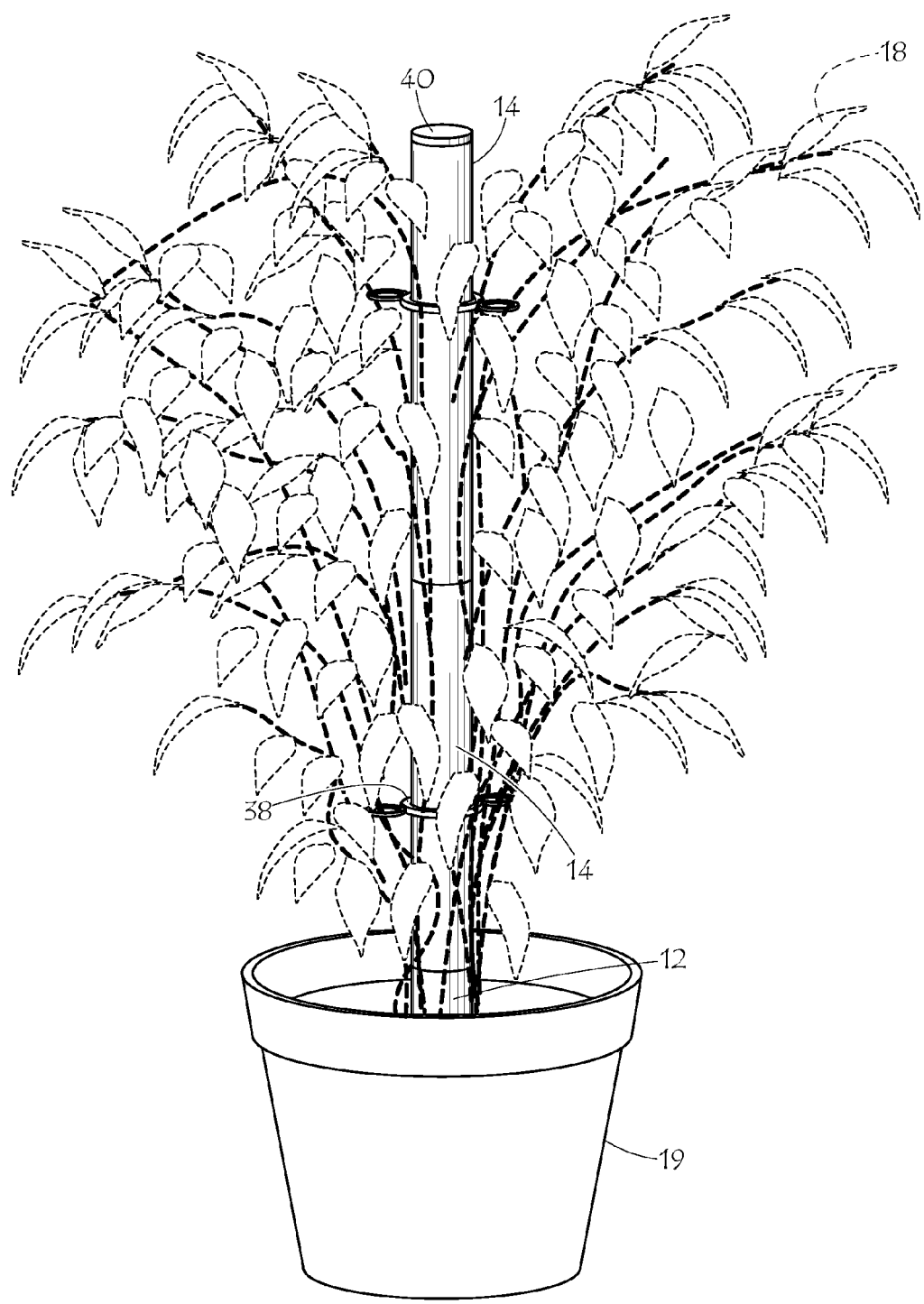

Each hollow tubular extension-section 14 includes an externally threaded lower open end 34 and an internally threaded upper open end 36, which allows the lower end 34 to be threaded into open end 20 of tubular body 12 and the open end 36 of another extension section, thereby enabling the body and extensions 14 to be connected to each other to provide the connected, continuous tubular member (not numbered) shown in FIG. 2. In use, water (and perhaps fertilizer) (not shown) is supplied to (poured into) an open end 36 of extension section 14 which exits out through perforations 28 into the earth or plant soil (not shown) surrounding a plant 30 to water the plant. Additional extension sections 14 can be added as needed to provide a resultant plant watering and support device 10 capable of supporting plant 30 as it grows and/or support plants of different heights.

Tubular body 12 and extension sections 14 may be constructed out of any suitable material, such as, for example, metal, glass or plastics material, or a suitable combination thereof, and may be constructed of a cylindrical plastics material which is at least partially transparent in sections so as to permit a visual inspection of the hollow cavity contained therein.

As also shown, wide base 16 has an internally threaded center portion 38 for threaded attachment to lower end 22 of the tubular body to support the tubular body in an upright position. In accordance with an important aspect of the present invention and as shown in FIG. 1, base 16 has a width A which is at least twice the predetermined width B of central portion 24 (preferably more than three times width B as shown) so that base 16 can maintain the device in an upright position without any additional assistance such as soil, rocks and the like. As such, it will be appreciated, that device 10 is ideally suited for use in plant pots such as illustrated pot 19 as shown which typically are not deep enough to receive a stake or other plant support.

Moreover, as those skilled in the art will appreciate, device 10 can be placed in a plant pot before the plant and soil/rocks are placed in the pot. This facilitates the planting or potting process and enables the plant watering device to be further secured by the soil and/or rocks which as will be appreciated are placed on top of base 16 and thereby in essence hold the device down. As such, the device when so secured will be less likely to tilt or tip over. In addition, if base 16 is made out of a heavier material such as steel or iron the device's center of gravity can be further lowered, thereby further reducing the possibility of the device as well as the pot and plant from tilting or tipping over.

Also illustrated are connectors or tie rings 38 each of which has a pair of outer rings 39. Ring 38 is slipped over an extension section 14 and is used with string or ties (not shown) to tie plant 18 to the outer rings 39 to support the plant. Tie ring 38 is sized to tightly receive an extension section 14 so that friction therebetween prevents the ring from freely sliding downwardly on the extension section.

In addition, FIG. 1 illustrates that device 10 may additionally include a cap 40 which fits into end 36 of extension 14 (or end 20 of body 12) to seal device 10 and prevent the evaporation of water added to the plant via the device. Finally, FIG. 1 further illustrates that device 10 may include a funnel 42 which is inserted into end 36 of extension 14 (or end 20 of body 12) to facilitate the pouring of water into the device.

A preferred embodiment of the present invention provides the following method for watering a potted plant which includes inserting a watering and plant support device such as device 10 having perforations 28 and a base 16 into a pot such as pot 19 with the base placed against the bottom of the pot. The roots of a plant as well as soil are then placed in the pot above the base of the watering device. Enough soil is then added to the pot to cover the perforations in the central portion of the watering device. In addition, the method includes attaching the plant's branches to the central portion of the watering device to support the plant. Finally, the method includes adding water to the watering device via its open upper end which when added enters the hollow cavity of the device and then exits through the perforations to wet the soil in the pot and water the plant.

While the primary use of device 10 is with a pot such as pot 19, device 10 can be used outside of a pot. For instance, a gardener who wants to grow a seedling tree or tomato etc. outside, could plant the seedling etc. with the device in the ground outside, i.e. without a pot. Likewise, growth of a seedling could be started in a pot inside and then transplanted outside and, as will be appreciated, base 16 allows device 10 to be lifted out of the pot with the plant remaining supported and intact, i.e. without disturbing the plant's roots. The base 16 of the device can then be unscrewed from the device and replaced with a larger base for transplanting the plant into a larger pot. Or, if transplanting outside, it may be desirable to simply remove the device's base 16 if the plant's roots have grown enough. In either case, it will be appreciated that the plant's root system is protected and supported during the transplanting process, thereby preventing transplant shock to the plant.

This invention has been described in detail with reference to a particular embodiment thereof, but it will be understood that various other modifications can be effected within the spirit and scope of this invention.

I claim:

1. A method for watering a potted plant comprising:
   inserting a watering device having an elongated tubular body with a base into a pot with the base placed against the bottom of the pot and wherein the tubular body has an open upper end, a lower end and a central portion of predetermined width located between said open upper and said lower end, said open upper end and central tubular portion defining a hollow cavity for receiving water added through said open upper end, said central tubular portion further defining a plurality of perforations in fluid communication with the hollow cavity, said perforations extending through the tubular portion to allow water added to the device to exit the device through the perforations to water the plant, said base having a width which is at least twice the predetermined width of the central portion but less than the width of the bottom of the pot;
   placing the roots of a plant and soil in the pot above the base of the watering device having been inserted in the pot;
   adding enough soil to the pot to cover the perforations in the central portion of the watering device;
   attaching branches of the plant to the central portion of the watering device to support the plant;
   adding water to the watering device via its open upper end which when added enters the hollow cavity of the device and then exits through the perforations to wet the soil in the pot and water the plant;
   lifting the device and plant out of the pot to facilitate transplanting of the plant;
   removing the base from the device after lifting it out of the pot; and,
   replacing the base with a wider base.

2. A method for watering a potted plant as claimed in claim 1 further comprising adding a hollow extension section to the watering device, said extension section having an open upper end, an open lower end and a hollow non-perforated central portion and wherein the extension section is added by attaching the lower end of said extension section to the open upper end of the tubular body and wherein the open lower end of said extension section is adapted for removable attachment to the open upper end of the tubular body.

3. A method for watering a potted plant as claimed in claim 2 further comprising attaching branches of the plant to the non-perforated central portion of the extension section.

4. A method for watering a potted plant as claimed in claim 2 further comprising adding water to the watering device through the open upper end of the extension section which when added enters the hollow of the extension section and the hollow cavity of the tubular body and then exits through the perforations to wet the soil in the pot and water the plant.

5. A method for watering a potted plant as claimed in claim 2 further comprising capping the watering device by attaching a cap to the open upper end of the tubular body or extension section to reduce water evaporation.

6. A method for watering a potted plant as claimed in claim 2 further comprising inserting a funnel into the open upper end of the tubular body or extension section to facilitate the pouring of water into the device.

7. A method for watering a potted plant as claimed in claim 1 further comprising placing the plant and device with the wider base into a larger pot.

* * * * *